(12) United States Patent
Borza et al.

(10) Patent No.: US 6,215,874 B1
(45) Date of Patent: Apr. 10, 2001

(54) RANDOM NUMBER GENERATOR AND METHOD FOR SAME

(75) Inventors: Stephen J. Borza, Ottawa; Gordon Freedman, Nepean, both of (CA)

(73) Assignee: Dew Engineering and Development Limited, Ottawa (CA)

( * ) Notice: Subject to any disclaimer, the term of this patent is extended or adjusted under 35 U.S.C. 154(b) by 0 days.

(21) Appl. No.: 09/023,460

(22) Filed: Feb. 13, 1998

Related U.S. Application Data

(63) Continuation-in-part of application No. 08/728,549, filed on Oct. 9, 1996, now abandoned.

(51) Int. Cl.$^7$ ......................................................... G06F 7/58
(52) U.S. Cl. .............................. 380/46; 380/44; 708/255; 708/250
(58) Field of Search ........................ 380/46, 44; 364/717; 708/250, 251, 252, 253, 254, 255, 256

(56) References Cited

U.S. PATENT DOCUMENTS

| | | | | |
|---|---|---|---|---|
| 3,706,941 | * | 12/1972 | Cohn | 331/78 |
| 3,913,031 | * | 10/1975 | Membrino | 331/78 |
| 4,876,725 | * | 10/1989 | Tomko | 382/4 |
| 5,706,218 | * | 1/1998 | Hoffman | 367/717 |

* cited by examiner

Primary Examiner—Pinchus M. Laufer
Assistant Examiner—Hrayr A. Sayadian
(74) Attorney, Agent, or Firm—Freedman & Associates

(57) ABSTRACT

A method and system of generating random numbers using imaging transducers of a charge coupled array. Noise signals detected by a first and a second imaging transducers of the array are processed together to yield a first value; noise signals detected by a third and a fourth imaging transducers are processed together to yield a second value; the first and second values are processed together to yield the random number.

13 Claims, 8 Drawing Sheets

RANDOM NUMBER GENERATOR AND METHOD FOR SAME

This is a continuation in part of U.S. application Ser. No. 08/728,549 in the name of Borza filed on Oct. 9, 1996, now abandoned.

FIELD OF THE INVENTION

This invention relates generally to random number generation and more particularly relates to a method of generating a sequence random numbers using noise presented to or from within a charge coupled device (CCD) or the like.

BACKGROUND OF THE INVENTION

Computer security is fast becoming an important issue. With the proliferation of computers and computer networks into all aspects of business and daily life—financial, medical, education, government, and communications—the concern over secure file access is growing. One method of providing security from unauthorized access to files is by implementing encryption and cipher techniques. These techniques convert data into other corresponding data forms in a fashion that is reversible. Once encrypted, the data is unintelligible unless first decrypted. RSA, DES, PGP, and CAST are known encryption techniques that are currently believed to provide sufficient security for computer communication and files.

Each of the encryption techniques uses a key or cipher. Such a key is crucial to the encryption/decryption process. Anyone with a correct key, can access information that has previously been encrypted using that key. The entry of the key from the keyboard is impractical since a key remembered by a user for entry is liable to be discovered by an individual desiring unauthorized access to existing encrypted files.

In DES encryption, the key is a numerical value, for example 56 bits in length. Such a key can be used to encrypt and subsequently to decrypt data. The security of the data once encrypted is sufficient that the key is required to access the data in an intelligible form. Thus, the security of the data is related to the security of the key.

In an optical fingerprint input transducer or sensor, the finger under investigation is usually pressed against a flat surface, such as a side of a glass plate, and the ridge and valley pattern of the finger tip is sensed by a sensing means such as an interrogating light beam.

Various optical devices are known with employ prisms upon which a finger whose print is to be identified is placed. The prism has a first surface upon which a finger is placed, a second surface disposed at an acute angle to the first surface through which the fingerprint is viewed and a third illumination surface through which light is directed into the prism. In some cases, the illumination surface is at an acute angle to the first surface, as seen for example, in U.S. Pat. Nos. 5,187,482 and 5,187,748. In other cases, the illumination surface is parallel to the first surface, as seen for example, in U.S. Pat. Nos. 5,109,427 and 5,233,404. Fingerprint identification devices of this nature are generally used to control the building-access for information-access of individuals to buildings, rooms, and devices such as computer terminals.

In capacitive fingerprint imaging devices, a fingertip is pressed against an array of sensing electrodes. Each electrode forms one of two electrodes in a capacitor. Each capacitor is generally pre-charged to provide a known voltage. The placement of the fingertip on the sensing electrodes results in changes to the induced voltages or capacitances and therefore allows for imaging of the fingerprint. Devices of this type are well known in the art.

The use of random numbers has become popular in many aspects of computer science. An annealing algorithm generates and entire process based on an initial random seed. The seed allows the process to be repeated, but its random nature allows the annealing process to run differently each time. In encryption technology, random keys are also used for generating private and public keys. Unfortunately, computers are only capable of generating pseudo random numbers. These numbers may follow known sequences for they may rely on date and time information making them predictable.

Several electronic approaches to random number generation have been proposed. It is known to use a resistive circuit that generates a voltage or current to be measured that lies at an exact value. Voltages above and below the value are interpreted as a one and a zero, respectively. Of course, it will be apparent to those of skill in the art that the selection of one to be above the threshold is arbitrary and that the respective interpretation can be otherwise. The random nature of the binary value is ensured based on the laws of quantum physics. Unfortunately, such a system is influenced by external factors such as temperature, humidity, etc. Also, electronic random number generators for use with a computer are often costly.

When conditions change, existing devices often become unreliable. For example, a resistance based device often produces a sequence of "random" numbers of a dubious nature when temperature changes are significant. As is well known, this is often the case within computer systems, where bright lights are used, near doorways, in electronic devices, in automobiles, and so forth. As such, as more flexible random number generating device and method is needed.

OBJECT OF THE INVENTION

It is an object of this invention to provide a cost effective means of generating a random number having a configurable distribution.

SUMMARY OF THE INVENTION

In accordance with the invention, there is provided, a method of generating a number within a random sequence of numbers using a device comprising a plurality of sensors. The method comprises of steps of:

a) sensing, with a first transducer, data to provide a first sensed data signal comprising noise presented to or from within the device;

b) sensing, with a second transducer, data to provide a second sensed data signal comprising noise presented to or from within the device; and, c) determining a value based substantially on the noise within each of the first sensed data signal and the second sensed data signal.

A further embodiment comprises the additional steps of:

d) sensing, with a third transducer, data to provide a third sensed data signal comprising noise presented to or from within the device;

e) sensing, with a fourth transducer, data to provide a fourth sensed data signal comprising noise presented to or from within the device;

f) determining a second value based substantially on the noise within each of the third sensed data signal and the fourth sensed data signal; and, g) based on the second value modifying the determined value to provide the number.

In accordance with another aspect of the invention there is further provided a device for generating a random number comprising:

an array of input transducers disposed to accept input information and to each provide a signal in dependence upon the input information provided thereto; and, a processor for receiving at least two of the signals from the input transducers in the array of input transducers and for determining a value substantially based on a portion of the signals that is non-repeating and non-predictable in nature.

In accordance with the invention there is further provided a device for generating a random number comprising: an array of input transducers disposed to accept input information and provide at least a signal in dependence upon the input information provided to each of the input transducers from the array of input transducers; and, a processor for receiving the at least a signal and for determining a non-predictable and non-repeating value based substantially on a portion of the information received at a transducer from the array of transducers, said portion being non-predictable and non-repeating in nature.

The advantages of a system in accordance with this invention are numerous. For example, random number generation will vary effectively from computer to computer thereby decreasing chances of predicting random number values.

It is a significant advantage that a device according to the invention is capable of calibration and reconfiguration during normal use.

It is a significant advantage of the present invention that a single transducer array serves multiple purposes.

BRIEF DESCRIPTION OF THE DRAWINGS

An exemplary embodiment of the invention will now be discussed in conjunction with the attached drawings in which.

DETAILED DESCRIPTION

Throughout the specification and claims, the term random number is defined to mean a number that is not predictable. For example, the definition of random number generation in the Computer Dictionary, 1993. Microsoft Press is "The creation of a number or sequence of numbers characterized by unpredictability so that no number is any more likely to occur at a given time or place in the sequence than any other." Of course this refers to a random number generator producing a flat distribution of random values. Other distributions are known and do not reduce the random nature of the sequence. For example, a die with two faces having a 1 thereon has twice the likelihood of resulting in a 1 and yet results in a random sequence when thrown repeatedly. A random number as defined above, is a number in a sequence of numbers wherein the sequence exhibits certain statistical behaviors. For example, a random sequence generated by a random number generator is non-repeating, non-predictable, and non-reproducible.

The term non-deterministic random number is defined to mean a number that is not determinative based solely on an input to a system and forms a subset of random numbers.

A pseudo-random number is a deterministic number determined in a fashion that causes it to appear random when in fact it is not; it is repeatably determined and given a seed value, can be regenerated using a same pseudo-random number generator.

A near random number is a number that is a random number but that does not subscribe to a desired distribution either because the distribution varies over time or because it is statistically predictable in some way.

Figure 1:
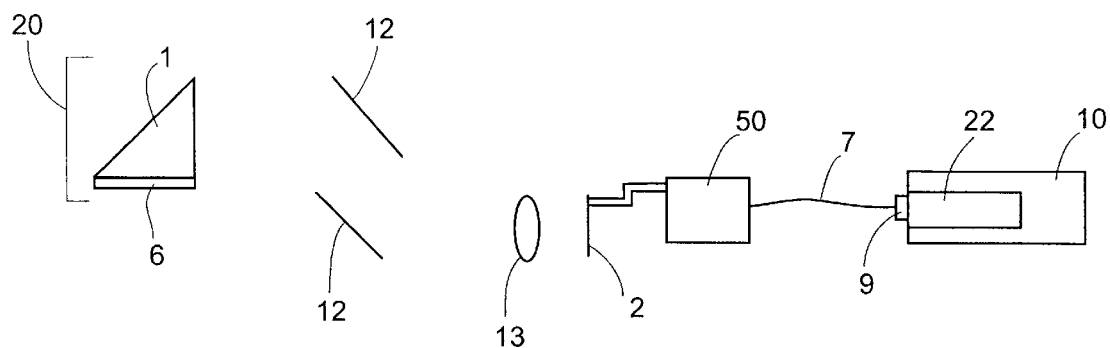
FIG. 1 is a block diagram of a known biometric sensing device with an additional diffusing cover thereon according to the present invention.

A device, shown in FIG. 1, comprises a biometric sensing device 1 through which biometric input in the form of a fingerprint is received. Similar devices absent the diffusing cover 20 are known in the art of biometric sensing. In use a fingertip is placed on the biometric sensing device 1 and illuminated. Light from a light source 6 is reflected by the fingertip is reflected off several mirrors 12 prior to passing through a lens 13 to focus upon a CCD 2. The number of mirrors used is optional but is chosen so as to limit other light sources (noise) and to limit image degradation. Alternatively, no mirrors are present and the light reflected by the fingertip is passed directly through the lens 13. The lens 13 is spaced from the CCD 2 so that an image is focused upon the CCD 2. Such optical focus is well known in the art.

The CCD 2 is capable of converting an incident optical image into electrical signals; such use of CCDs is known. From the CCD is output an analog electrical signal. The output electrical signal is passed to circuit 50 which adjusts the signal as necessary to meet a pre-selected analog video signal standard which is then transmitted by the circuit 50 via the carrier means 7 to a connection means 9 which in turn is connected to a frame grabber 22. The frame grabber 22 is commonly a peripheral card installed within a computer 10.

When no fingertip is located on the prism 1, the CCD 2 captures ambient light. Some of this light is from sources external to the biometric scanner. Other light is from a light source within the biometric scanner. Yet another source of captured light is backlight. The exact percentage from each is unknown and somewhat random within a range of values. Calibration of the device in a particular environment or providing the device with a cover 20 provides some indication of a percentage of a signal derived from ambient light or light sources and a percentage of light derived from other sources such as noise.

The CCD 2 has a large number of pixels within the device (for example 200×300) in order to provide sufficient resolution. To generate a single binary value, all 60,000 pixels can be summed and averaged. This value will fall between 0 and the depth of the pixels (in value and not in bits). Once calibrated, a value will map onto a bit of "1" or a bit of "0" and therefore result in the selection of a binary random number.

Essentially, the invention relies on the existence of white noise—random noise—at the input transducer and filters out a known signal of ambient diffused light or of a known pattern in the case of a device provided with a cover. The use of a CCD as the input transducer is rendered cost effective both because CCD costs are falling and because a CCD is known to be used with a computer for other applications such as biometric sensing. Multiple uses of a CCD allow each function to bear only a portion of the cost of the electronic device. Further, the use of a CCD provides numerous transducers and thereby allows for software configuration, calibration, and selection of a desired distribution of values for the random sequence.

Figure 2:
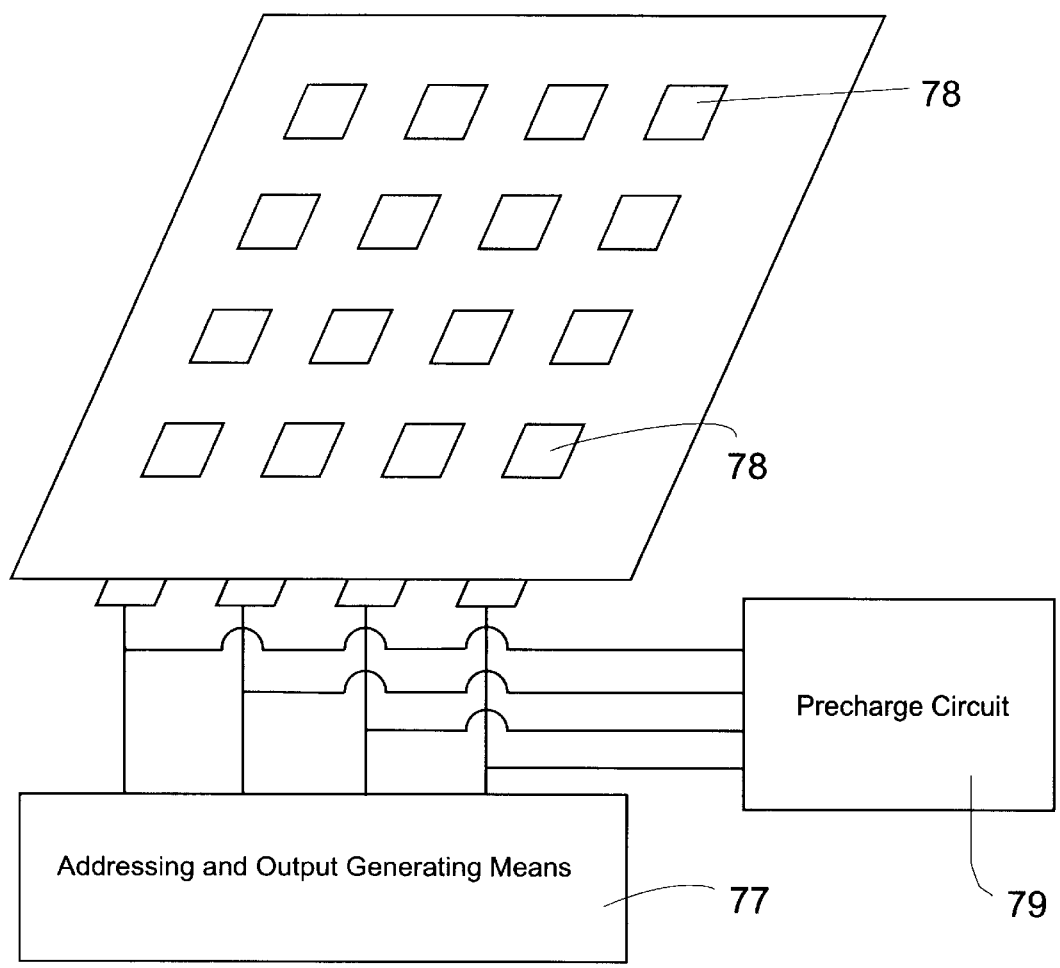
FIG. 2 is simplified diagram of a capacitive fingerprint imaging device.

Referring to FIG. 2, a capacitive fingerprint imager is shown. Similar devices are known in the art of biometric sensing. The imaging device comprises an array of sensing plates 78 spaced apart to prevent interference. The plates are pre-charged by a pre-charging circuit 79 to a predetermined voltage. When a fingertip is placed in contact with or in close proximity to the sensing pads, the capacitance is changed and this change is measured or output by addressing and output generation means 77. As in a CCD, the capacitive fingerprint imager often has circuitry for addressing each transducer (sensing pad and associated circuitry) and for converting values provided by each transducer into an analogue serial signal provided as an output signal. The output signal is then sampled at a predetermined frequency in order to digitize the information and make use of it within a computer or other microprocessor based device. Alternatively, the signal can be encoded on a non-volatile storage medium such as magnetic tape for later retrieval.

When used with the present invention, it is desirable that the sensing pads be allowed to float (unconnected to ground) when used for random value generation. The floating sensing pads result in a signal with a substantial noise component that is suitable for pseudo random number generation. The signal is sampled at predetermined times to produce sampled values. Random values are determined in dependence upon these sampled values. For example, the sampled values are filtered to remove ambient signals (real data) and then the remaining component (substantially noise) is evaluated. When it is above a predetermined threshold a "1" bit results. Conversely, when it is below a predetermined value a "0" bit results. It will be apparent to those of skill in the art that alternatively, a "1" bit may result from a lower value and a "0" bit from a higher value.

An embodiment of the invention will now be described in which a diffusing cover 20 is placed over an optical fingerprint sensor in order to prevent light flicker, dust, or other variables from affecting system operation.

Figure 3:
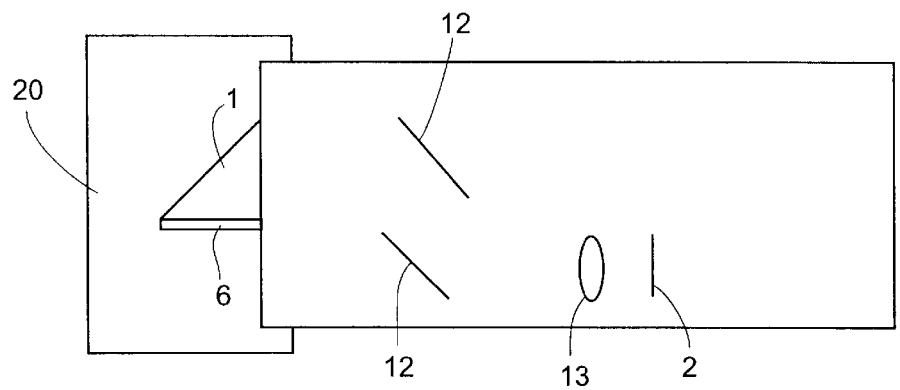
FIG. 3 is a simplified diagram of an optical fingerprint imaging device with an additional diffusing cover thereon according to the present invention.

Referring to FIG. 3, and optical fingerprint scanner is shown comprising a biometric sensing device through which biometric input in the form of a fingerprint is received, several mirrors 12, a lens 13, and a CCD 2. The number of mirrors used is optional but is chosen so as to limit other light sources (noise) and to limit image degradation when the device is used for its intended purpose of fingerprint imaging. Optical fingerprint devices are known in the art. The biometric input device in the form of a prism acts to diffuse ambient light. Alternatively a device according to this invention is provided with a diffusing cover 20. The cover acts to diffuse light from external sources evenly across the cover.

In operation, the device is calibrated and an ambient light level is established. The calibration is performed at the beginning of each day. Alternatively, the calibration is performed at predetermined intervals throughout each day. Transducers within the charge coupled device received approximately equivalent diffused light. At least some transducers are selected for use in random number generation. The transducers are selected randomly. Alternatively, the transducers are selected based on a statistical determination of randomness of generated values. Further alternatively, the transducers are selected based on a pattern of transducer selections.

It is advantageous to use a plurality of transducers as described herein. Firstly, use of an array of transducers provides flexibility in use, reliability from failure, and additionally, when a plurality of transducers such as a CCD array is used, similar transducer inputs are often easily identified to improve performance by simplifying the process of extracting random information from transducer signals.

The selected transducers (as well as all other transducers) receive light diffused by the diffusing cover 20. The transducers also received back-scattered light in the form of noise. The noise is sufficient to effect the induced charge in at least some transducers, thereby introducing noise into the CCD signal. The non-noise portion of the signal is filtered out for the selected transducers and the remaining signal comprising substantially noise is evaluated. Noise values above a predetermined value are defined as "1" bits while those values below a predetermined value are defined as "0" bits. Alternatively, the noise is quantized into a 2 bit, 3 bit, . . . , n bit value. Alternatively, the noise is not quantized and is used to generate analogue random values.

Figure 4A:
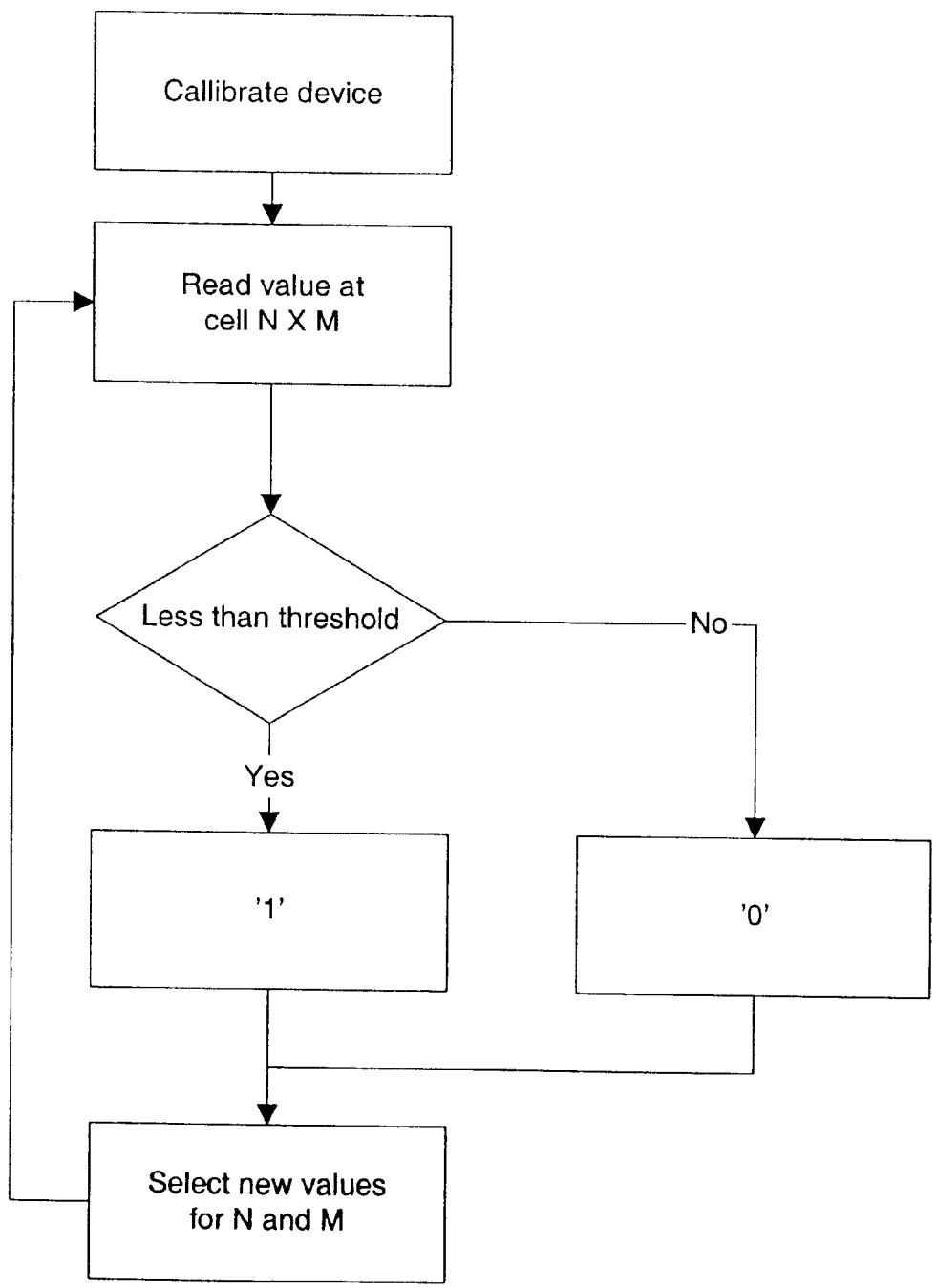
FIG. 4a is a flow diagram of a method according to the present invention.

Referring to FIGS. 4a, 4b, 4c and 4d, alternative flow diagrams for the device are shown. In FIG. 4a, the distinction between a "1" bit and a "0" bit are determined by a threshold value. As such, selected transducers should have no correlation in response to ambient light or any intended stimulus having a noise component or some other substantially non-deterministic and non-repeatable component. Such a lack of correlation may occur when ambient light is constant or truly random, or where selected transducers are affected by different ambient light sources. In FIG. 4a, a method is employed wherein calibration is first performed. Thereafter, signal corresponding to intensity and frequency of light incident on transducers within the CCD is provided by the CCD and a value corresponding to a predetermined transducer is rad. Reading a value is performed by digitizing the signal at an appropriate time. Alternatively, reading a value is performed by reading a digital value from a memory where it is previously stored. A threshold value as determined by the calibration process is compared to the read value. A value higher than the threshold value results in a '1' output and a value lower than the threshold value results in a '0' output. Alternatively, a higher value results in a '0' output and a lower value results in a '1' output.

Advantages provided by switching transducers when not random are significant. For example, when a transducer is random at times or becomes stable for a while, switching to other transducers provides continuous operation. Also, when a data input is provided to a transducer, others potentially have no input. This is common, for example, in biometric contact imagers. Often a fingertip only covers a portion of a fingerprint scanner, for example, This allows selection of transducers in corners of the imaging device wherein data input is often not provided. Of course, flexibility, reliability and ease of calibration remain significant advantages. Also, selection of a distribution for the generated sequence of random numbers is enabled according to the present method.

Figure 4B:
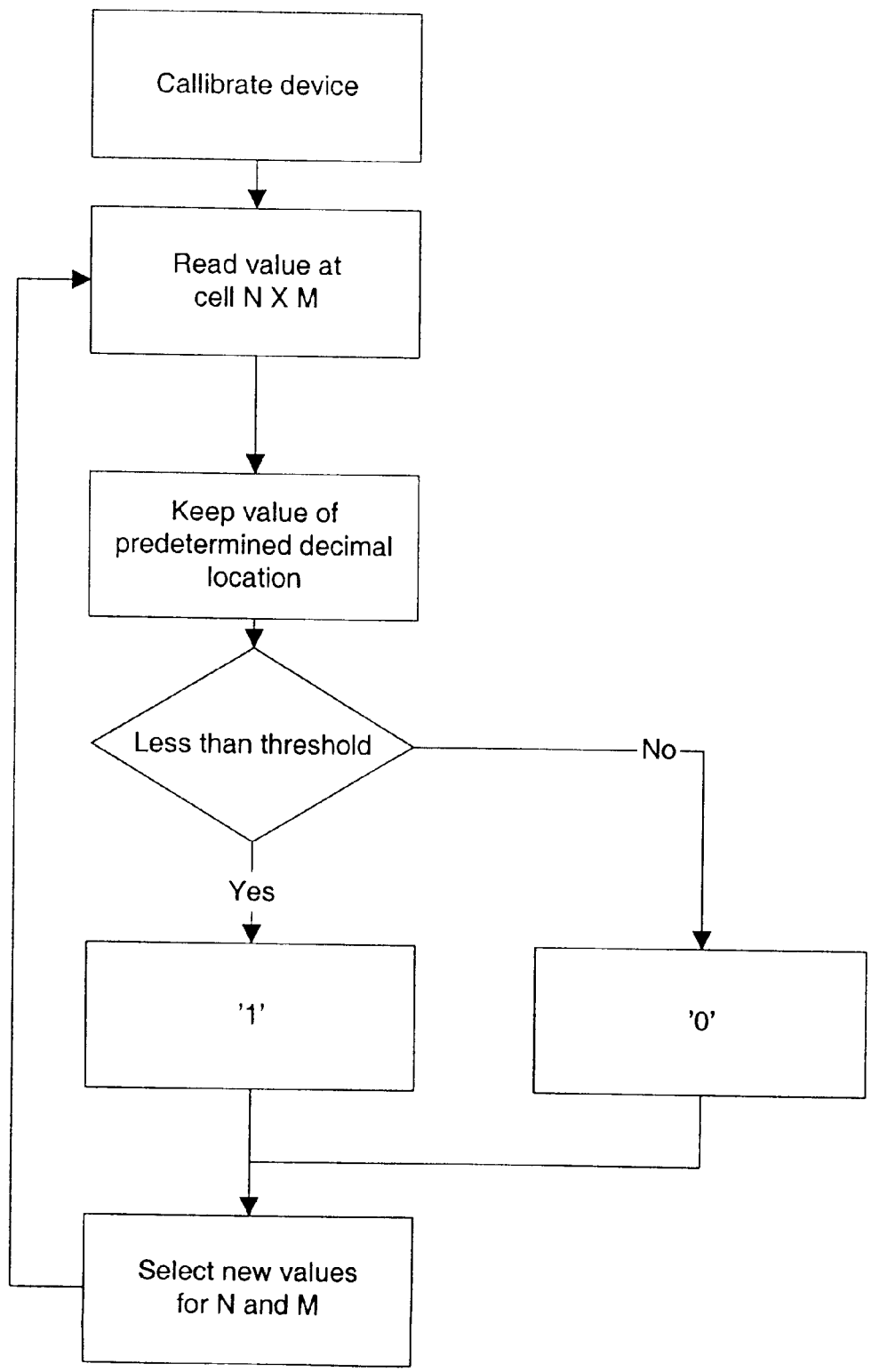
FIG. 4b is a flow diagram of another method according to the present invention.

Referring to FIG. 4b, a flow diagram is shown for use with a CCD in the form of a video camera, optical fingerprint sensor, or other device used with a computer. During use, the device captures images of external objects and as such, there is likely a strong similarity between signals from adjacent transducers within the CCD. The use of a method as exemplified by the diagram of FIG. 4a would result in "random numbers" of dubious quality. According to the method of FIG. 4b, the signal present at each transducer within the CCD is measured at a high enough precision to be a measure of substantially white noise. For example, if we were to filter out all values up to 9 decimal places within the ambient signal, the resulting decimal value fluctuates in accordance with white noise and is therefore likely random.

Persons of skill in the art, would be able to test for randomness. One such series of tests is set out in Knuth, Donald E. *The Art of Computer Programming, Seminumerical Algorithms* Vol. 2. Addison Wesley, 1969 on pages 1–155. The analysis of the random nature of the sequences of generated values is a straightforward test requiring mere experimentation and verification. For example, a series of numbers is said to be random when a sufficiently large number of the numbers in the series exhibit randomness. The numbers will average to the average of the desired distribution, have the desired distribution—appropriate standard deviations etc., do not follow a discernable pattern—twenty ones then twenty zeros—and so forth. Testing a device to evaluate randomness and quality of random number generation is a mere experiment and statistical analysis. Performing such and experiment and analysis allows for better selection of a filter function and a suitable threshold.

Though, for testing randomness of numbers, Knuth is suggested herein, it is solely as a reference for that purpose. Knuth provides adequate explanation of random number testing including frequency of occurrence of given numbers, average, standard deviation, variation overtime, etc.; however, the specific definition of random number presented therein is not incorporated herein.

Figure 4C:
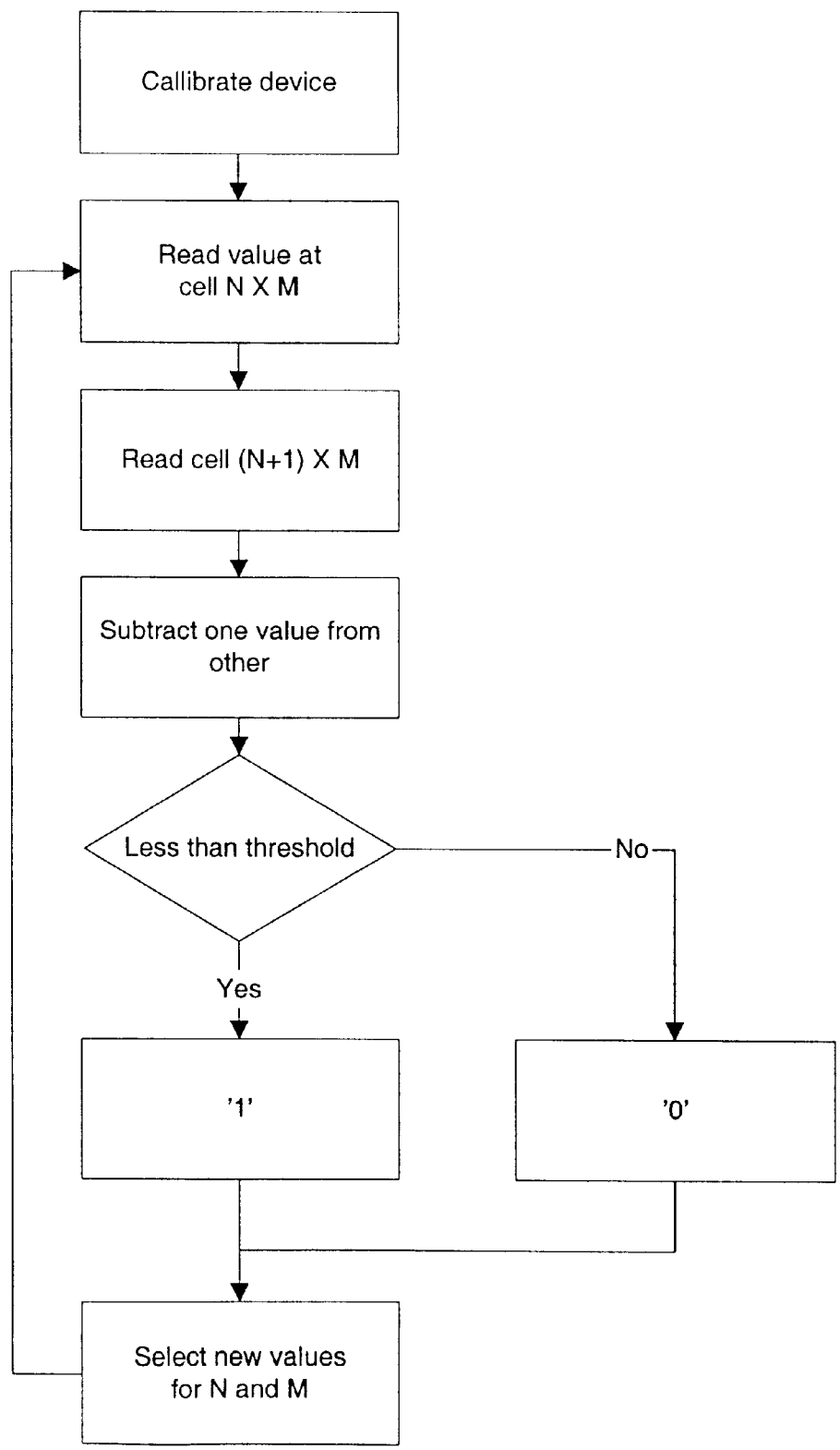
FIG. 4c is a flow diagram of another method according to the present invention.

Referring to FIG. 4c, a further method of using white noise provided to or from within a plurality of transducers is shown. Such a method is best applied when two transducers receive substantially the same information. This is so when two microphones are placed side by side, in some adjacent transducers of a CCD array, or in most transducers of a CCD array when provided with light from a same source or when focused on a uniform surface. Signals from adjacent transducers or other transducers receiving substantially same information are read and their values subtracted to form a signal representative of substantially the white noise of one signal from one transducer minus the white noise of a signal from the adjacent transducer. When ambient light is present (as is the case with an optical fingerprint sensor provided with a cover or a video camera with a diffusion covering) and no discernible non-linearities exist within the CCD field of view, each transducer provides and information signal that is substantially similar to signals provided by adjacent transducers. The main difference between signals from adjacent transducers is attributable to noise. When such is the case, the method produces random values of good quality. Alternatively, when such is the case a value is read from each of two transducers and the values are compared. The comparison results in a '0' for less than and in a '1' for greater than. Equivalent values are either grouped into '1' or '0' or are treated as a special case, or alternatively, are included within one of the two previous cases.

There is a significant advantage to using a plurality of signals comprising noise to determine a random number, the signals from a plurality of transducers. For example, the use of two signals provides a mix of two random noise values. The use of 100 signals provides a mix of 100 random noise signals. Statistically, the use of many random noise signals results in a random value even when some of those signals become somewhat deterministic or the noise therein is nominal over a period of time. As such, reliability is enhanced.

Also, the use of a number of signals from a number of different transducers results in configurability not known in the prior art. Distributions become configurable by selecting and weighting different values determined based on noise portions of different signals to result in a desired distribution. This provides for a random number generator and method of generating random numbers that allows for different random number functions to be supported by a same physical device.

For example, when a distribution having a 90% chance of providing a value from 0–1 and a 10% chance of providing a value form 1–2 is desired, a first pair of signals is used to generate a random number. A second pair of signals is used to generate a second random number. Each random number has a flat distribution from 0 to 1. When the second random number is above 0.9, 1 is added to the first random number. The resulting value has the desired distribution. Of course, the signals are selected so that noise portions of the different signals are dissimilar and unrelated. Optionally, more than two signals are used for generating each random number. It is evident of those of skill in the art, that many simple and very complex random number distributions are supported by such a device.

Figure 4D:
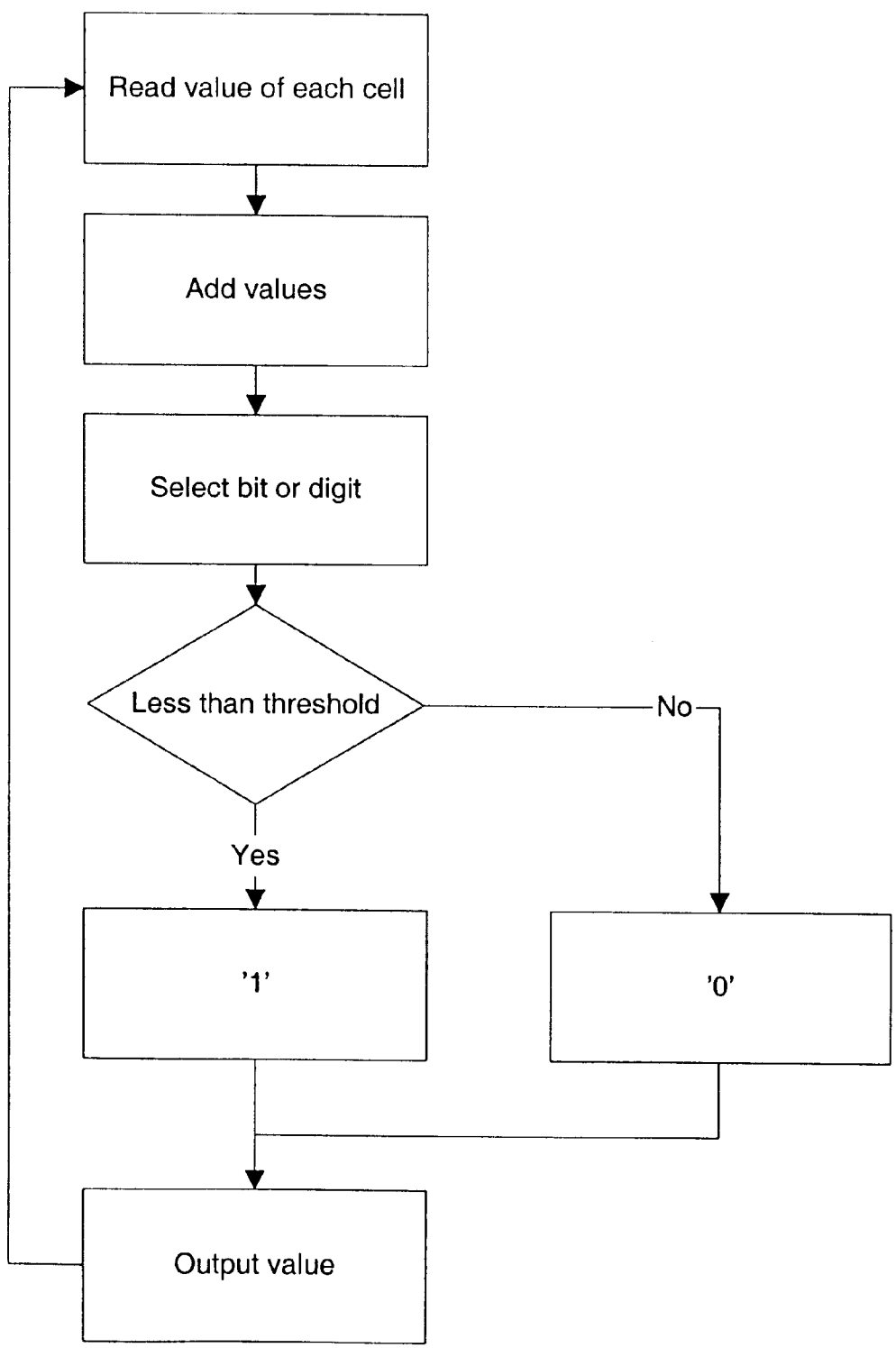
FIG. 4d is a flow diagram of yet another method according to the present invention.

Referring to FIG. 4d, a further method of using the white noise is shown wherein signals from each of a plurality of transducers are sampled and signal values are added to form a single value based on the output from a group of transducers. The result is then compared to a threshold value to determine a random value, which is output. Alternatively, the result is further transformed prior to determining a random value. One form the further transformation can take is subtracting out higher order digits in order to limit the value to a non-ascending value; preferably, this value is comprised mostly of noise.

Figure 4E:
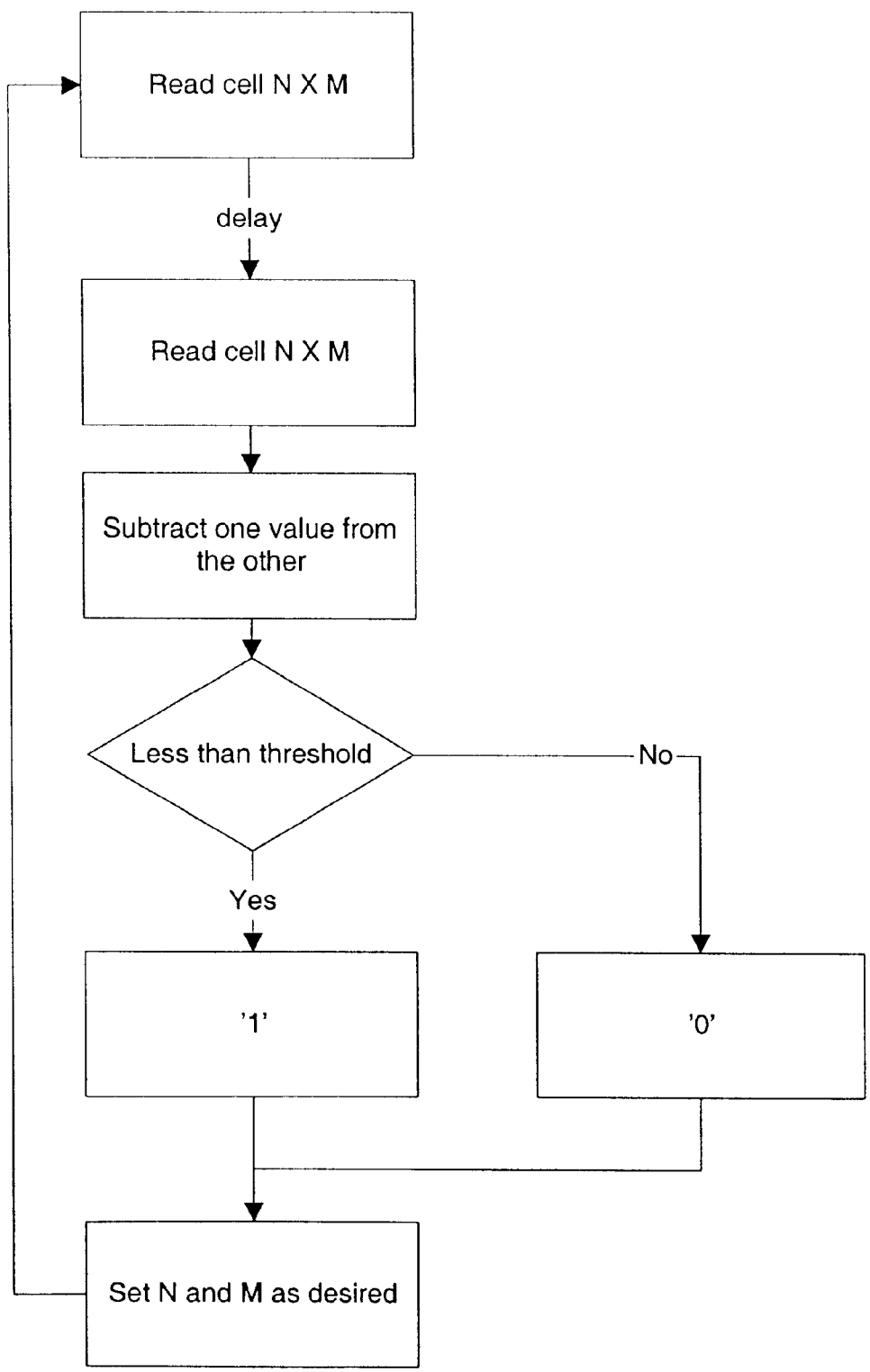
FIG. 4e is a flow diagram of yet another method according to the present invention.

Referring to FIG. 4e, a further method of using white noise is shown wherein a signal from each of a plurality of transducers sis sampled and the sampled values are subtracted from values of sampled signals from same or similar transducers from another time. For ambient light, images often remain relatively constant with the exception of slight variations and noise. Using a subtractive method of transducers from a present frame from transducers of a past frame (or vice versa), allows the constant nature of the frames to be exploited for extracting noise from images. The result is then compared to a threshold value to determine a random value, which is then output. Alternatively, the result is further transformed prior to determining a random value. One form the further transformation can take is subtracting out higher order digits in order to limit the value to a non-ascending value; preferably, this value is comprised mostly of noise.

Preferably, a combination of methods is concurrently available within a device or on a host computer and the selection of the method is based on a statistical analysis of randomness of the device. Alternatively, a user selects the method employed. Further alternatively, the method employed is predetermined.

It will be clear to those of skill in the art that the use of a diffusing cover is optional. In spaces where ambient light is random or relatively constant, said cover is obviated. Also, where the input device is already provided with diffusing means or means for performing a similar function, a further cover is unnecessary. It will be clear to those of skill in the art that relocating such a device requires re-calibration.

Advantageously, the device is and adaptation of and existing device. For example, another embodiment will now be described with reference to FIG. 1. When the diffusing cover 20 is replaced with a non-transmissive cover, light from the light source 6 is reflected off a platen surface of the prism 1 toward the mirror 12 and via an optical path to the transducer array 2. The information content of such a signal is substantially uniform over areas of the CCD 2, and therefore over a plurality of adjacent transducers. A noise portion of signals from those transducers is a result of noise within the light source, noise from backscattered light, and other noise sources within the device such as inductance, capacitance, temperature, air and so forth. Using the method of FIG. 4c or FIG. 4e is particularly advantageous with such a configuration. Of course, the methods of FIGS. 4a, 4b, or 4d are also applicable.

It will be clear to those of skill in the art that the use of a non-transmissive cover is optional when the prism 1 is substantially or at least partially reflective and wherein light from outside the device does not substantially affect the captured image. Alternatively, when light from outside the device does substantially affect the captured image, a method of filtering that light is used.

Figure 5:
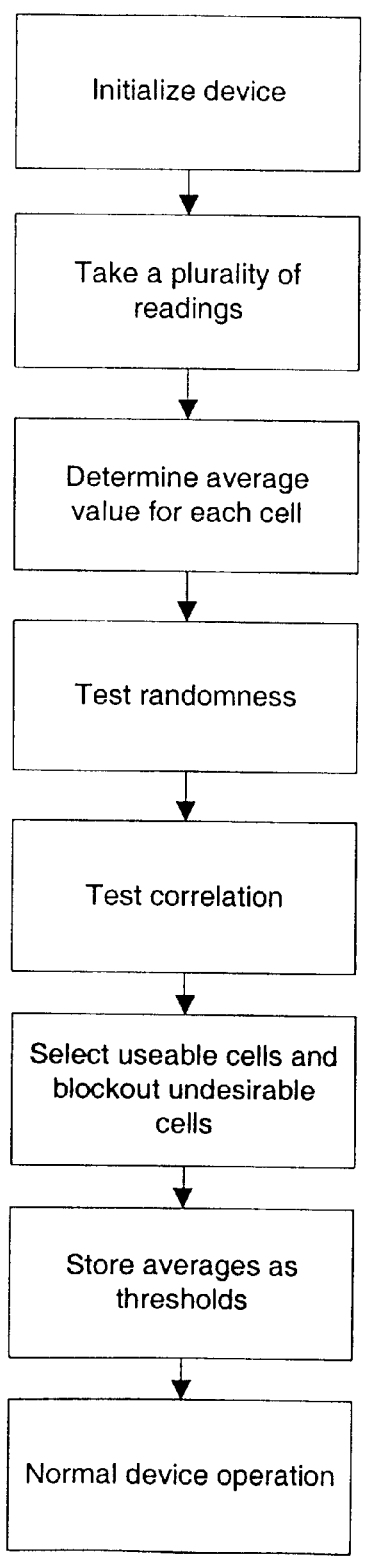
FIG. 5 is a flow diagram of a method of calibrating a device according to the present invention.

Referring to FIG. 5, a flow chart of a method of calibrating a system according to the present invention is shown. The system is initialized. This sets the input transducer array into a normal mode of operation for capturing images. A plurality of images is captured while the device is not in normal use. When a cover is used, the cover is in place prior to capturing the plurality of images. For each transducer and average value is determined. Alternatively, standard deviation, average and median values are determined to ensure that the threshold value selected is statistically correct. The randomness of the values read is analyzed. This analysis includes testing for correlation among adjacent transducers and distribution. Signals from any transducers, which are not sufficiently random (as determined by user preference settings), are noted and associated transducers are blocked out. These transducers are not used by the system, at least until user preferences are changed or re-calibration occurs. The averages are stored for each transducer excepting those blocked out as threshold values. Alternatively, other values determined to be more statistically correct are stored as threshold values. Once threshold values are determined, the system is placed in a normal mode of operation.

Alternatively, when threshold values are not used, calibration is performed to verify the randomness of the noise within a transducer array and to establish any correlations between transducers within the array. Established correlations are then used to determine transducer groupings and an applicable method of extracting noise from the signals. Further alternatively, no calibration is performed.

Where sufficient noise exists, similar methods to those set out are employable during normal use of a transducer array. For example, a fingerprint sensor images a fingertip and subtracts the image from other images of the same fingertip in order to achieve a signal in dependence upon which random values are generated. Alternatively, pseudo random numbers are determined in dependence upon a specific bit or a specific digit within at least a value determined in dependence upon at least a signal from the transducer array.

The random numbers generated according to the present invention are useful as seeds to pseudo-random number generators. For example, in an annealing process, it is useful to generate a random pseudo-random number. This is accomplished by generating a random seed. The seed is then provided to the user for repeating the same annealing process at a later time. Pseudo-random number generators are well known and are therefor not more fully described herein.

The invention relies on the duplicate use of an imaging device for imaging and for providing a signal comprising noise for use in random number generation.

Further, the invention relies on noise at each of a plurality of transducer to generate a random value having a desired distribution and other desired properties. The use of a plurality of transducers in a configurable fashion as described herein is not known in the art.

In an embodiment, when a normal distribution of values is desired from a random number generator according to the invention, signals from each non-blocked transducer are sampled and a distribution of noise within each signal is evaluated. Those signals that when combined result in noise having a substantially normal distribution are noted. Those same signals are then sampled during random number generation. A significant advantage of the present invention is that reconfiguring the random number generator requires little skill and no hardware modifications. To change the random number generator from a sequence having a normal distribution to one having a flat distribution requires selection of this option and possibly a re-calibration of the device.

Alternatively, several distributions are calibrated simultaneously and then a user selects a distribution as desired. As such, a calibration process may store five or six different distributions and the signals determined necessary for achieving those distributions. Upon selecting any of the distributions, the random number generation proceeds based on the determined signals.

Numerous other embodiments may be envisaged without departing from the spirit and scope of the invention.

What is claimed is:

1. A method of generating a number within a random sequence of numbers using a device comprising a charge coupled device array, the method comprising the steps of:

a) sensing, with a first imaging transducer of the charge coupled device array, a first signal to provide first data indicative of the first signal, wherein at least a portion of the first signal comprises noise presented to or from within the first imaging transducer;

b) sensing, with a second imaging transducer of the charge coupled device array, a second signal to provide second data indicative of the second signal, wherein at least a portion of the second signal comprises noise presented to or from within the second imaging transducer;

c) determining a first value from the noise portion within each of the first data and the second data;

d) sending, with a third imaging transducer of the charge coupled device array, a third signal to provide third data indicative of the third signal, wherein at least a portion of the third signal comprises noise presented to or from within the third imaging transducer;

e) sensing, with a fourth imaging transducer of the charge coupled device array, a fourth signal to provide fourth data indicative of the fourth signal, wherein at least a portion of the fourth signal comprises noise presented to or from within the fourth imaging transducer;

f) determining a second value from the noise portion within each of the third data and the fourth data; and g) generating the number within the random sequence of numbers by modifying the determined first value using the determined second value.

2. A method of generating a number within a random sequence of numbers as defined in claim 1 comprising the step of:

comparing the noise based value to a threshold value and providing a first binary value when the noise based value is below the threshold value and a second different binary value when the noise based value is above the threshold value.

3. A method of generating a number within a random sequence of numbers as defined in claim 1 wherein the step of determining a first value based on the noise portion comprises the step of:

subtracting a value derived from the first data from a value derived from the second data to provide a difference therebetween, wherein the difference is the first value.

4. A method of generating a number within a random sequence of numbers as defined in claim 1 wherein the step of determining a first value based on the noise portion comprises the step of:

subtracting a value derived from the first data from a value derived from the second data to provide a difference therebetween, wherein the first value is determined based on the difference.

5. A method of generating a number within a random sequence of numbers as defined in claim 1 wherein the step of determining a first value based on the noise portion comprises the step of:

comparing the first data and the second data to provide a comparison result, wherein the first value is a first binary value for a first comparison result and a second different binary value for a second different comparison result.

6. A method of generating a number within a random sequence of numbers as defined in claim 1 comprising the steps of:

extracting a combined noise portion from the first data and from the second data; and sampling the combined noise portion to produce a sampled value, wherein the first value is determined in dependence upon the sampled value.

7. A method of generating a number within a random sequence of numbers as defined in claim 1 wherein the step of determining a first value comprises the steps of:

sampling the first data to provide a first sampled value;

sampling the second data to provide a second sampled value; and subtracting the first sampled value from the second sampled value.

8. A method of generating a number within a random sequence of numbers as defined in claim 1, wherein the step of determining a first value comprises the steps of:

determining a primary value based on the noise portion within the first data;

determining a secondary value based on the noise portion within the second data; and based on the primary value modifying the secondary value to provide the first value.

9. A method of generating a number within a random sequence of numbers as defined in claim 8 wherein modifying the secondary value comprises adding an amount to the secondary value, the amount determined in dependence upon the primary value.

10. A method of generating a number within a random sequence of numbers as defined in claim 8 wherein modifying the secondary value comprises determining a range of values for the secondary value in dependence upon the primary value.

11. A device for generating a number within a random sequence of numbers comprising:

an imaging charge coupled device array including at least 4 imaging charge coupled devices, each input imaging charge coupled device of the imaging charge coupled device array providing a signal in dependence upon input information provided thereto, wherein at least a portion of the signal comprises noise presented to or from within the imaging charge coupled device; and a processor for receiving signals from at least four of the imaging charge coupled devices in the imaging charge coupled device array, for determining a first value based on the portions of first two different signals comprising noise and a second value based on the portions of second two different signals comprising noise different from the first two different signals comprising noise, and for determining the number within the random sequence of numbers by modifying the first value based on the second value.

12. A device for generating a number within a random sequence of numbers as defined in claim 11, the device comprising:

a prism including a platen for accepting a fingerprint;

a light source for directing light toward the platen, a portion of the light reflecting off the platen along an optical path, wherein the charge coupled device array is disposed within the optical path to provide signals in dependence upon light within the optical path incident thereon.

13. A device for generating a number within random sequence of numbers as defined in claim 12 comprising a diffusing cover for the platen.

* * * * *

UNITED STATES PATENT AND TRADEMARK OFFICE
CERTIFICATE OF CORRECTION

PATENT NO. : 6,215,874 B1
DATED : April 10, 2001
INVENTOR(S) : Borza et al.

It is certified that error appears in the above-identified patent and that said Letters Patent is hereby corrected as shown below:

Column 1,
Line 49, "with" should read -- which --.

Column 2,
Line 36, "as" should read -- a --.

Column 6,
Line 48, "rad" should read -- read --.

Column 7,
Line 57, "and" should read -- an --.

Column 8,
Line 22, "form" should read -- from --;
Line 47, "sis" should read -- is --.

Column 9,
Line 8, the terms "and" should read -- an --;
Line 38, "and" should read -- an --.

Column 10,
Line 17, "transducer" should read -- transducers --.

Claim 1,
Step d, "sending" should read -- sensing --.

Signed and Sealed this

Second Day of April, 2002

Attest:

JAMES E. ROGAN
*Director of the United States Patent and Trademark Office*

*Attesting Officer*